United States Patent [19]

McMahon

[11] 3,891,968

[45] June 24, 1975

[54] COHERENT OPTICAL PROCESSOR APPARATUS WITH IMPROVED FOURIER TRANSFORM PLANE SPATIAL FILTER

[75] Inventor: Donald H. McMahon, Carlisle, Mass.

[73] Assignee: Sperry Rand Corporation, New York, N.Y.

[22] Filed: Apr. 4, 1974

[21] Appl. No.: 457,750

[52] U.S. Cl. ....... 340/146.3 E; 350/162 SF; 356/71

[51] Int. Cl. ..................... G06k 9/13

[58] Field of Search ............... 340/146.3 E, 146.3 P; 350/162 SF; 356/71; 250/237 R, 236, 233, 550; 178/7.6

[56] References Cited

UNITED STATES PATENTS

| | | | |
|---|---|---|---|
| 3,370,268 | 2/1968 | Dobrin et al. | 356/71 |
| 3,409,872 | 11/1968 | Hogg et al. | 356/71 |
| 3,716,301 | 2/1973 | Caulfield et al. | 356/71 |
| 3,771,124 | 11/1973 | McMahon | 340/146.3 P |
| 3,809,478 | 5/1974 | Talbot | 350/162 SF |

*Primary Examiner*—Leo H. Boudreau
*Attorney, Agent, or Firm*—Howard P. Terry

[57] ABSTRACT

A line pattern or fingerprint ridge pattern identification apparatus employs coherent optical processing techniques wherein the line or ridge orientations and spacings in a plurality of preselected finite areas of the fingerprint are inspected by means of a rotating spatial filterdisposed in the Fourier transform plane of the optical processor for cyclically selecting distinct components of the Fourier transform for transmission to the image plane of the processor in which is disposed a plurality of photodetectors each corresponding to a discrete sampled area of the print. The time delays between a reference orientation of the spatial filter and the blocking and unblocking of light transmitted therethrough toward each photodetector are noted. These values are processed to provide proportional representations thereof for storage and for subsequent comparison with similarly obtained signals representative of ridge line orientation and separation of a fingerprint presented for identification.

14 Claims, 6 Drawing Figures

COHERENT OPTICAL PROCESSOR APPARATUS WITH IMPROVED FOURIER TRANSFORM PLANE SPATIAL FILTER

CROSS REFERENCE TO RELATED PATENT

This invention is related to the invention of the D. H. McMahon U.S. Pat. No. 3,771,124 for a "Coherent Optical Processor Fingerprint Identification Apparatus", issued Nov. 6, 1973 and assigned to the Sperry Rand Corporation.

BACKGROUND OF THE INVENTION

1. Field of the Invention

The invention relates generally to optical processors and more particularly to a method and apparatus for fingerprint indentification utilizing coherent optical processing techniques.

2. Description of the Prior Art

It is known that automatic high speed fingerprint identification can be obtained by the use of optical signal processing techniques; accordingly, a variety of devices and methods is known in the prior art having the objective of staisfying this requirement. In some of the prior art processors, details image of the fingerprint to be identified is compared optically with a prerecorded image of the fingerprint. In other types of coherent optical processors, comparison is made between input and prerecorded Fourier transform signals representative of the fingerprint data. These image and Fourier transform signal comparators have been implemented using either conventional or holographic techniques and essentially constitute matched filter or auto-correlator devices providing an indication either of full comparison or of non-comparison between a modulated optical beam representative of the fingerprint and a prerecording of the print. Other somewhat more sophisticated devices provide inspection or comparison of certain detials of the input fingerprint with prerecorded fingerprint data; for instance, the location of ridge line endings or the slopes of the ridge lines in one region have been determined relative to the slopes of the ridge lines in another region of the fingerprint. Such systems, however, tend to become elaborate, often inherently requiring complex implementation.

As to the matched filter or correlator types of identification systems, it is apparent, where it is desired to discriminate between larger numbers of individuals, that a suitable recognition system would preferably provide a plurality of identifying data bist as opposed to a single data bit as in the form of an analog signal. Evidently, such a singel data bit device simply indicates recognition or lack of recognition and has other inherent limitations. However, higher accuracy can be achieved by abstracting many bits of information using this collective data with digital processing to arrive at a binary recognition decision. Such a capability is desirable or even essential in applications using rapid data transmission or digital computer processing and requiring compatability with conventional drum, disk, tape, or other storage apparatus. Further, reliance on a single composite signal, as provided by a matched filter device, adversely affects accuracy and discrimination capability because such devices are sensitive, for example, to the orientation and to distortion of the fingerprint.

It is widely acknowledged that the identification of latent fingerprints is a currently pressing problem. With the present state of the art of manual classification and file searching, latent fingerprint identification cannot be accomplished economically so as to restrict the number of criminal or other suspects to a practically limited number of individuals. The recognition system of the aforementioned patent measures print line orientations in an array of discrete finite areas of the fingerprint as a valuable method of fingerprint identification. Such a technique, based as it is on measuring a multiplicity of ridge orientations, is particularly advantageous for fingerprint identification based on all 10 fingerprints; however, it may not be fully effective in a large fingerprint library if only one or a few prints or partial prints are available to make the identification. A possible solution to the problem lies in simply expanding the capability of the apparatus of the aforementioned patent so that several thousand or more angles per print are measured, thus supplying data with sufficient detail to resolve minutae which are often unique characteristics of individual fingerprints.

SUMMARY OF THE INVENTION

According to the present invention, the capability of the patented arrangement is expanded by abstracting two different kinds of information from the fingerprint pattern. In essence, the invention uses an improved type of Fourier transform spatial filter in a coherent optical processor to determine average fingerprint ridge spacing as well as average orientation. It will, of course, be recognized that the novel spatial filter may be used for recognition of line patterns other than those strictly characteristic of fingerprints.

The invention provides a means for the rapid sampling of the orientation and the separation of the ridges making up a fingerprint pattern by using coherent light and by measuring the variations in transmitted or diffracted light. The print image, placed on a transparent substrate, is used in a processing system wherein the line or ridge orientations a plurality of preselected finite areas of the fingerprint are inspected. This inspection is accomplished by a novel rotating spatial filter placed in the Fourier transform plane of the optical processor. Rotation of the spatial filter provides cyclic selection of distinct components of the Fourier transform for transmission to the image plane of the processor, in which plane there is placed a plurality of photodetectors, each corresponding to a discrete sampled area. The time delays between a reference orientation of the spatial filter and the blocking and unblocking of light transmitted therethrough to each photodetector is noted by a system employing electrical diferentiation of the transmitted light signal. The timing of the bipolar differentiated pulses provides representations both of the ridge orientations and separations for storage or for direct comparison in a suitable digital processor with similarly obtained signals which may be stored in a print library. It is a further object of the present invention to provide an improved fingerprint inspection apparatus which is comparatively simple and inexpensive to manufacture, less sensitive to optical and manufacturing tolerances, less sensitive to fingerprint orientation and distortion, capable of high reliability, and adaptable for use with digital computer processing apparatus.

DESCRIPTION OF THE PREFERRED EMBODIMENTS

Before proceeding with a description of the method and apparatus embodying the principles of the invention, it is worthwile first to consider briefly the nature of a typical fingerprint. In general, a fingerprint is characterized by a pattern of ridge lines having both relatively constant spacing and orientation over any finite but small area. The present invention is based on means for inspection of the ridge line orientation and separation in a plurality of such small sampled discrete areas distributed generally uniformly over the area of the fingerprint. It will be appreciated that, in a given fingerprint, the various ridge line orientations and separations at the plurality of sampled positions are uniquely different from the ridge line orientations and separations at a plurality of similar positions for any other fingerprint, provided that a sufficient number of sample areas is used.

Figures 1, 2, 3, 4, 5:
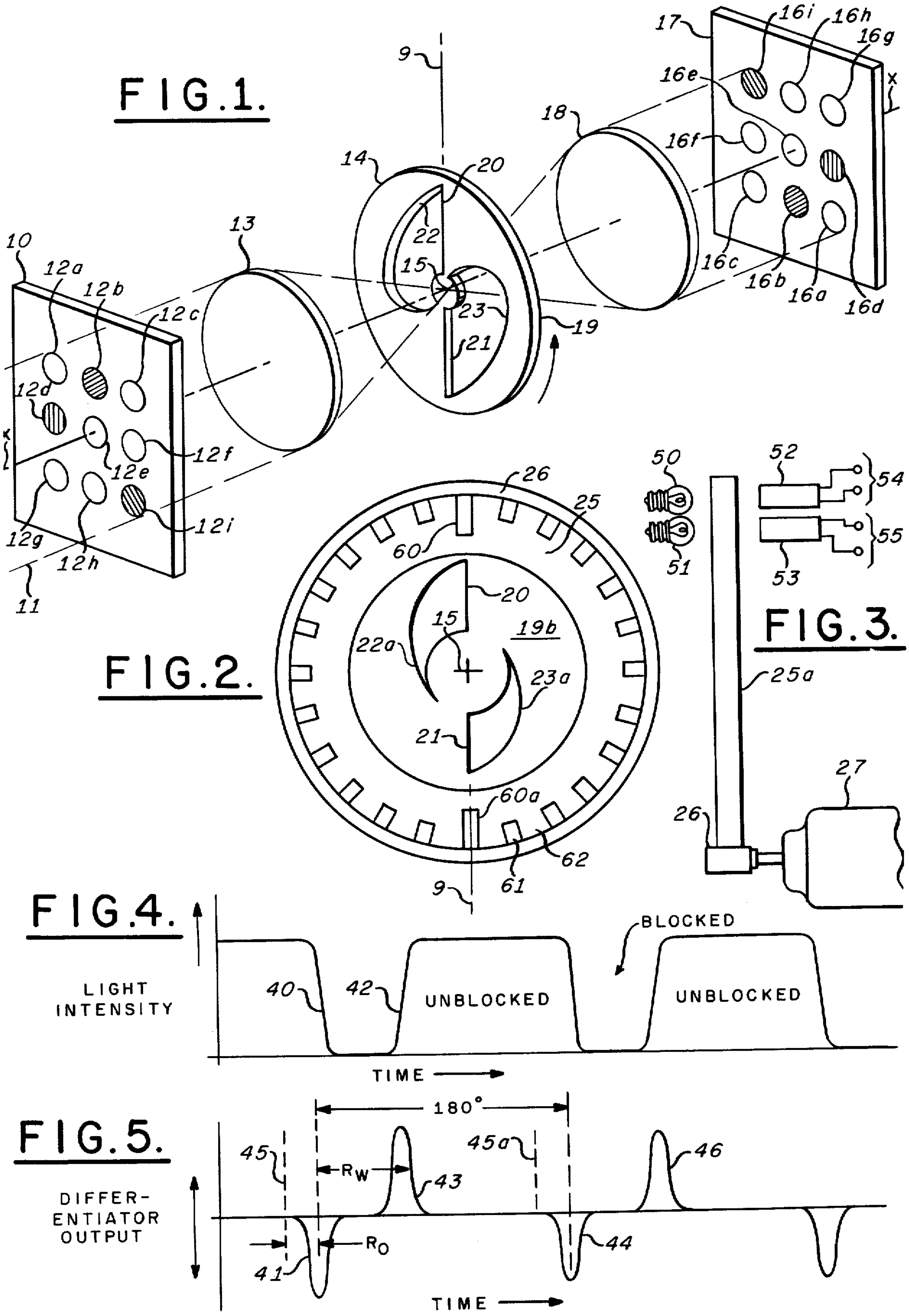
FIG. 1 is a perspective view of an optical pattern identification system embodying the principles of the invention.
FIGS. 2 and 3 are views of the novel rotatable spatial filter employed in the apparatus of FIG. 1.
FIGS. 4 and 5 are graphs of wave forms useful in explaining operation of the invention.

Referring to FIG. 1, the fingerprint transparency 10 is disposed in the path 11 of a coherent light beam which may be generated, for example, by a laser or other conventional coherent light source. The actual fingerprint, which is not shown in total in the drawing for reasons of presentation which will become apparent, is intended to be located in a generally rectangular central area of the transparency 10. The small regions 12*a* to 12*i* are intended to represent a regular arbitrary array of fingerprint areas actually to be sampled and in which the ridge line orientation and separation details are to be evaluated. For purposes of description, it is assumed that the fingerprint ridge line orientations and separations differ, in general, in the several sampled areas. It is assumed, for example, that the ridge line orientation is vertical in the sample area 12*d* and slanted respectively to the right and left in the sample areas 12*b* and 12*i*.

The circular lens 13 collects the light transmitted through the transparency 10 and focusses it in the Fourier transform plane 14. The central point 15 lying on the optical axis X—X of the system represents the intersection with the Fourier plane of any undiffracted light transmitted through the transparency 10. Light diffracted by the presence of the lines of a fingerprint area such as at 12*b*, 12*c*, or 12*i* will come to a focus in the Fourier plane at locations other than point 15. It will be understood that each discrete ridge line orientation produces two major diffraction lobes symmetrically disposed according to their characteristic ridge separations about the undiffracted central point 15. A given pair of diffraction lobes will be symmetrically disposed along a line normal to the ridge lines so that one half of the Fourier plane will be essentially a duplicate of the other half. All of the sampled areas where fingerprint ridges are present at the transparency plane 10 produce simple Fourier transforms in the same manner. The exact shapes and locations of the diffraction lobes depend upon the presence, orientation, and separation of the fingerprint ridge lines.

It will be understood that the sampled areas 12*a* through 12*i* are not necessarily physically defined by any structural elements located at the transparency plane 10, but are in fact defined by the geometry imposed by photodetectors available on the market and by their selected arrangement in the plane of the detector array located at image plane 17. Thus, the nature and location of the sampled areas 12*a* through 12*i* are determined by the actual shapes of the detectors 16*a* through 16*i* and by the selected regular array in which they are arranged at image plane 17, according to the inverting nature of focussing lens 13 and imaging lens 18.

In the absence of the rotating spatial filter mark 19, the front face of which normally lies conicident with the Fourier transform plane 14, the imaging lens 18 would simultaneously collect light from all of the Fourier diffraction lobes and would consequently form an inverted transparency image confined within the rectangular boundary of the detector array at the image plane 17. Each detector 16*a* through 16*i* would receive light corresponding to a corresponding one of the discrete finite areas 12*a* through 12*i* of the transparency 10. Thus, for the case of the assumed ridge line orientations of areas 12*b*, 12*d*, and 12*i*, images at plane 17 might appear at the particular locations of detectors 16*b*, 16*d*, and 16*i*. It will be understood by those skilled in the art that a greater or lesser number of detectors may be employed depending upon the desired fineness of sampling. It will further be understood that the invention provides information concerning the degree of separation of the ridges in terms of the radial distribution of the light pattern about point 15 in the Fourier transform plane 14 as well as information concerning the orientation of the ridges in terms of the angular distribution of that light pattern.

The aforementioned U.S. Pat. No. 3,771,124 concerns fingerprint identification apparatus also utilizing certain of the coherent optical processing techniques thus far described with regard to the present invention. In the issued patent, ridge line orientations of selected areas of a fingerprint are inspected by a rotating spatial slit filter disposed in the fourier plane 14 for sequentially selecting discrete components of the Fourier transform for transmission to the image plane 17. The slit filter comprises an opaque disk with a diametrical slit or with oppositely extending radial slits of constant width, each beginning near a vertical solid portion of the mask coaxial with point 15. A negative type of such a mask in the form of a diametrically positioned opaque bar may alternatively be used. In the patented system, the time delay between a reference orientation of the slit or bar filter and the occurrence of a peak light signal at each detector of an array like that of the present FIG. 1 is noted and a proporitonal analog or digital representation thereof is generated for storage and ultimately for comparison with similarly obtained signals representative of a fingeprint presented for identification.

Considering FIGS. 1, 2, and 3, the scanning filter of the present invention comprises an opaque mask 19 centrally mounted in an annular mount 25 which may be supported in any convenient rotary bearing system (not shown). A rim surface 25a of the mount 25 may be rotationally driven by motor 27 when driving the pulley 26 in frictional engagement with that circular rim surface 25*a*. In place of the aforementioned regular width slits, oppositely disposed curved boundaries 22, 23 are employed respectively in association with lineal radial edges 20, 21. The radial edges 20, 21 are used in the present invention primarily to generate data defining fingerprint ridge orientation, which the spiral edges 22, 23 operate primarily to generate data defining fingerprint ridge separation. The actual shapes of edges 22, 23 may be varied; for example, in FIG. 2, the curved edges 22*a*, 23*a* are sectors of circles. Other generally similar curved continuous edges may be employed. Any convenient shape where the curved edge represents a monotonic function of the radial position versus angle will operate satisfactorily. However, the spiral-straight line configuration of FIG. 1 is particularly convenient because line spacing is linearly related to the time duration of the unblocked light pulse.

The angular position of the lineal edges 20, 21 is used to provide a measure of the angular position of the light diffracted in the Fourier plane relative to the axis X—X rotation of mask 19, as in the aforementioned patent. The angular position of a light beam interception point on one of the arcuate edges 22, 23 or 22*a*, 23*a* may be used as an indication of the radial position of diffracted light, and therefore of ridge separation. Characteristic of the spiral edges 22, 23 is that they may be employed to convert azimuthal position of the mask 19 into radial position of the light beam. However, the arrangement cannot be used alone, since the spiral edges yield a radial position measurement which also depends upon ridge orientation.

In the preferred form of the invention as shown in FIGS. 1, 2, and 3, the Fourier transform filter 19 is placed in the Fourier transform plane 14 so that, as the filter mask 19 is continuously rotated, diffracted light is alternately blocked by and transmitted through the filter 19. Rather than detecting extremum values of transmitted light level as in the aforementioned patent, the system of the present invention operates upon rates of change in transmitted light power. As the filter 19 rotates, a straight-line edge such as edge 20 first interrupts one component of diffracted light; that light component is then blocked until a spiral edge such as spiral edge 23 moves through the same location and thus through the same component of diffracted light. Light from that one diffracted component continues to be transmitted through filter 19 until the arrival of the next straight-line edge 21. Eventually, the arrival of spiral 22 completes the first cycle by unblocking the light component and the system continues to produce a cyclic output in a corresponding one of the several detectors 16*a* through 16*i*.

Such a cyclic output is illustrated in FIG. 4 and is generally characteristic in form of the outputs of each of the several excited detectors when illuminated. The system to be described employs time differentiation of the wave of FIG. 4 to create the bipolar output shown in FIG. 5, wherein electrical signals recognizable on the basis of their positive or negative polarities respectively convey data on the timing of the blocking and unblocking of the light transmission. For example, the blocking event at 40 in the wave form of FIG. 4 may be caused to generate, by use of a conventional differentiation circuit, the narrow negative pulse 41 of FIG. 5. Similarly, the unblocking event at 42 in the wave form of FIG. 4 may be used to generate the narrow positive pulse 43 of FIG. 5. Use of such differentiated signals is advantageous because the diffracted light signals vary in intensity over a very wide range and accurate measurements do not result simply by determining if the light level is higher or lower than a predetermined threshold value.

Because the scan of the fingerprint is accomplished twice per revolution of the mask or filter 25, reference pulses 45, 45*a* (FIG. 5) are produced each revolution, being spaced apart by 180 angular degrees, as will be additionally explained. It is seen that the positive pulses 43, 46 for an arbitrarily positioned diffraction component are also spaced apart by 180 angular degrees and, likewise, the negative pulses 41, 44 have the same spacing. The timing $R_o$ of a representative negative pulse 41 with respect to its associated reference pulse 45 is a direct function of ridge orientation. On the other hand, the timing of positive pulse 43 with respect to the reference pulse 45 is $R_o + R_w$, where $R_w$ is a function of the ridge width.

Referring again to FIGS. 2 and 3, the embodiment is equipped with an optical pick off system utilizing the aforementioned mounting disc 25. Light source 50 cooperates with the mount 25 to supply one set of pulse reference output signals at terminals 54 of the photocell 52. Similarly, light source 51 cyclically activates photocell 53 to supply output pulses at terminals 55. These two types of reference signals are utilized in the processing arrangements yet to be discussed in regard to FIG. 6. In FIG. 2, the periphery of the pick off mounting disc 25 contains alternating transparent and opaque sections such as 61 and 62, respectively, which function in combination with the light source 50 and photocell 52 for generating reference timing pulses to be applied to the counter 76 of the processing system of FIG. 6. Radially lengthened transparent sections 60, 60*a* on diametrically opposite sides of the mounting disc 25 function in conjunction with an additional light source 51 and light detector 53 for providing the counter reset pulses 45, 45*a* to the apparatus of FIG. 6 for indicating crossings of the vertical axis 9 of mask 19 passing through edges 20, 21. The optical pick off mounting disc 25 of the embodiment is integral with and will be driven in synchronism with the rotation of the mask 19 so that there is always one-to-one correspondence in the angular positions of mask 19 and pick off disc 25. While optical pick offs are illustrated in the drawings, known inductive, capacitive, or other pick-offs may be substituted.

Figure 6:
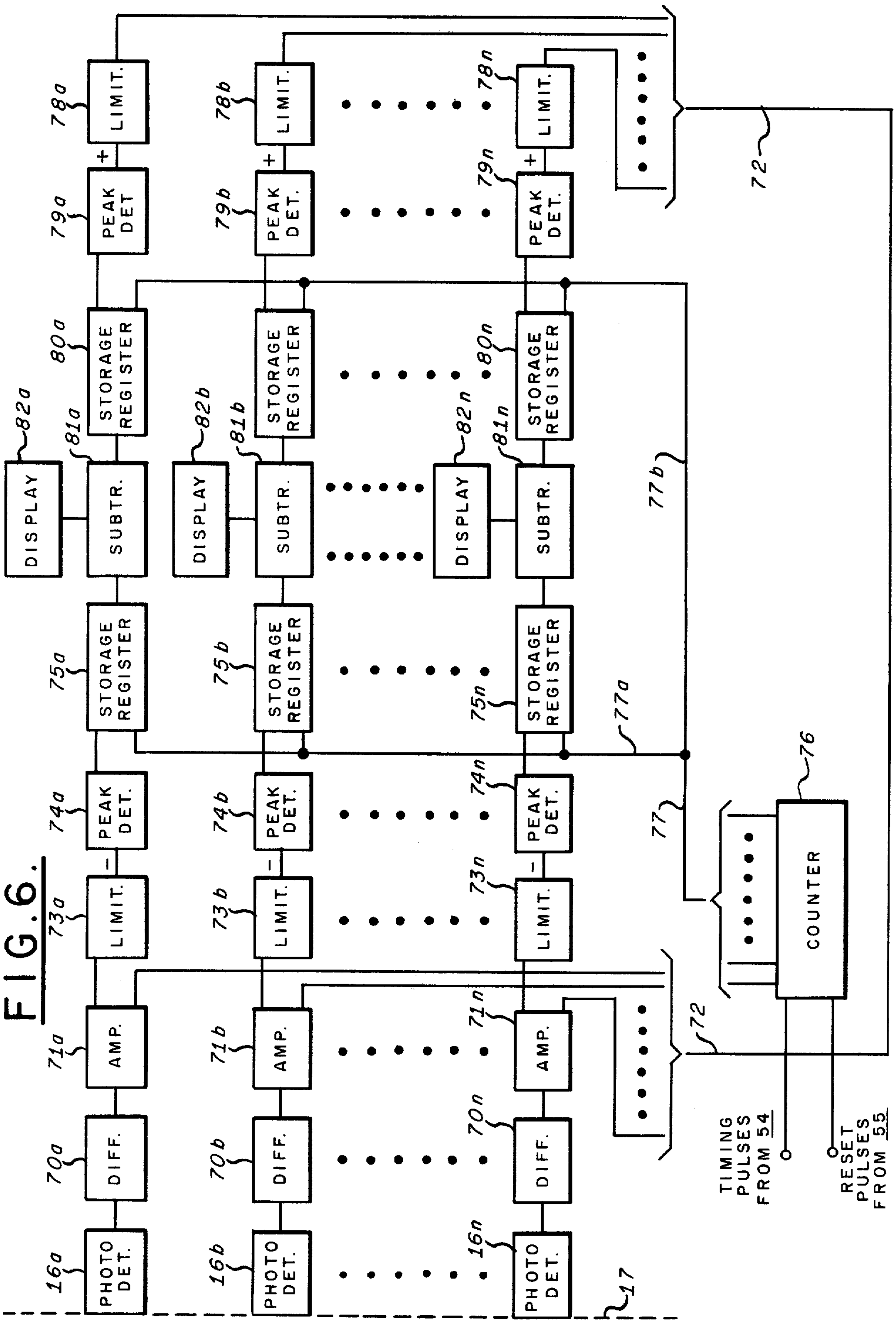
FIG. 6 is a diagram of an electrical signal processor for operation with the apparatus of FIGS. 1, 2 and 3, FIG. 6 showing electrical interconnections of the components of the apparatus.

Referring now particularly to FIGS. 1 and 6, it will be seen that as the mask filter 19 rotates, any one photodetector of the array 16*a* through 16*n* may receive a cyclic wave like that of FIG. 4 corresponding to the features of a particular area of the transparency 10. Thus, for the case of the assumed ridge lines of areas 12*b*, 12*d*, and 12*i*, the interaction of the mask opening will produce light images at the locations of detectors 16*b*, 16*d*, and 16*i*. As filter 19 is rotated, impulse waves such as that of FIG. 4 corresponding to each of the detectors 16*a* to 16*n* of the array are respectively coupled when present from the detectors to corresponding differentiator circuits 70*a* through 70*n* (FIG. 6). These latter circuits produce differentiated waves such as that of FIG. 5 that may be amplified by the respective amplifiers 71*a* through 71*n*. Only the negative pulse outputs of amplifiers 71*a* through 71*n* are passed by limiters 73*a* through 73*n* to an array of conventional peak amplitude detectors 74*a* through 74*n*.

Upon the crossing of the vertical reference axis 9 of FIG. 1, counter 76 of FIG. 6 is reset to zero and subsequently a sequence of synchronized timing pulses, representing the filter mask 19 orientation, is generated and is sent to the counter 76. The stages of the counter, in turn, are coupled to the respective stages of an array of discrete storage registers 75*a* through 75*n*, each associated with one of the light detectors of the image plane detector array, and each having display capability, if desired. The number of pulses in the counter at any one instant is representative of the angular position of the mask 19 relative to the vertical axis 9. Thus, in the case, for instance, where one clock pulse represents one degree of rotation of mask 19, counter 76 will have a count of 45° upon the mask line 20 reaching the position 45° counterclockwise from the vertical 9 in FIG. 1. If an electrical signal appears at the output of peak detector 74*i* at that instant of time, the input of a conventional multi-bit storage register 75*i* is enabled and the counter reading entered into the storage buffer. Each one of the array of storage registers 75*a* through 75*n* consists of a sufficient number of conventional latching circuits so as to represent the orientation of mask 19 to the desired degree of accuracy. These latching circuits operate to accept input data only when a gating clock input signal is applied to the clock input terminal of each stage of the register. Thus, a digital signal representative of the count of 45 will be stored in shift register 75 representing the angular orientation of the ridge lines in sample area 12*i*. Likewise, upon further rotation, mask 19 will transmit light corresponding to the ridge lines at a new sample area and at that instant another photodetector will produce an electrical output signal which when differentiated is applied through a related peak detector to provide a clock pulse to the associated storage register so that a digital signal corresponding to a new instantaneous count is stored in that register. The same action occurs at each successive angle for which there is a detector in the image plane 10. As a consequence of the line symmetry of filter 19 and the parallel digital processing, it will be recognized that the digital representation of all sample areas can be generated in one-half revolution of the filter 19. In the case of serial digital processing, on the other hand, where a single storage register is time shared, it would be possible to generate the digital signal for only one sample area in each half revolution of the scanning spatial filter or mask 19 and, thus, a number of revolutions equal to at least half of the number of sampled areas would be necessary to inspect all of the sample areas.

It is seen that the FIG. 6 apparatus thus far described is generally similar to that of the issued patent in certain aspects. In the present invention, a unique digital signal is stored in each storage register 75*a* through 75*n* corresponding to the fingerprint line orientation at each successively examined sample position. If the same transparency is similarly positioned in the optical system of the present invention at some later date, the same areas will inherently produce essentially identical digital signals which, when compared with the previously recorded signals, will be noted to be substantially the same and thus the invention performs identification by comparison of fingerprint orientation angles in selected areas of a print.

A principal advantage of the invention lies in the fact that the signal processor of FIG. 6 may be augmented so as to measure and display or store data on fingerprint ridge separation as well as ridge orientation data. To accomplish this end, the positive pulse train generated by differentiators 70*a* through 70*n*, after amplification, is supplied by cable 72 to a second set of conventional limiter circuits 78*a* through 78*n* which, unlike limiters 73*a* through 73*n*, pass only positive pulses. As has been discussed, these positive pulses include angular data on the ridge separations $R_w$ along with a measure of ridge orientation $R_o$. According to the part of the processor now to be discussed, the angular data representing orientation may be subtracted, leaving purely information on ridge separation.

The positive pulse outputs of the array of limiters 78*a* through 78*n*, when they occur, are coupled respectively to an array of conventional peak detector circuits 79*a* through 79*n*. An output of any one of the peak detectors will enable a corresponding one of the second array of storage registers 80*a* through 80*n*, permitting it to store and to display, if desired, in binary or other form data corresponding to $R_o + R_w$. In this manner, two sets of data identifying the tested fingerprint are generated, and without further modification, these two sets represent distinctive numbers for storage or other use in the fingerprint recognition art, such as direct display by the arrays of registers 75*a* through 75*n* and 80*a* through 80*n*.

The complete system of FIG. 6 permits the stored or processed data to be read out in direct terms of $R_o$ and $R_w$. For this purpose, each of the pair of storage register arrays cooperates with binary subtractor circuits 81*a* through 81*n* and the associated displays 82*a* through 82*n*. It will be understood that $R_o + R_w$ data in register 80*a*, for example, may be supplied in parallel or other relation to subtractor circuit 81*a* along with $R_o$ data from storage register 75*a*. Within the subtractor circuit 81*a*, the $R_o$ data is subtracted from the $R_o + R_w$ data, yielding binary $R_w$ data to be displayed by display 82*a*, for example. The other cooperating storage, subtractor, and display elements operate in a similar manner, including storage registers 75*n* and 80*n*, and display 82*n*. In this manner, the operator has directly available both $R_o$ and $R_w$ data on any fingerprint or portion thereof under inspection.

Accordingly, the capability of the prior art arrangement is expanded by abstracting two different kinds of information from the available fingerprint pattern according to the present invention. In essence, the invention uses an improved type of Fourier transform spatial filter in a coherent optical processor to determine fingerprint ridge spacing as well as orientation.

The invention provides a means for the rapid sampling of the orientation and the separation of the ridges making up a fingerprint pattern by using coherent light and by the observation of variations in transmitted or diffracted light. The print image, placed on a transparent substrate, is used in a processing system wherein the line or ridge orientations in a plurality of preselected finite areas of the fingerprint are inspected. This inspection is accomplished by a novel rotating spatial filter placed in the Fourier transform plane of the optical processor. Rotation of the spatial filter provides cyclic selection of distinct components of the Fourier transform for transmission to the image plane of the processor, in which plane there is placed a plurality of photodetectors, each corresponding to a discrete sampled area. The time delays between a reference orientation of the spatial filter and the blocking and unblocking of light transmitted therethrough to each photodetector is noted by a system employing differentiation of the transmitted light. The timing of the bipolar differentiated pulses provides representations both of the ridge orientations and the ridge separations for storage or for direct comparison in a suitable digital processor with similarly obtained signals such as may be stored in a print library. In this manner, the objects of the present invention are readily accomplished and there is provided an improved fingerprint inspection apparatus which is comparatively simple and inexpensive to manufacture, less sensitive to optical and manufacturing tolerances, less sensitive to fingerprint orientation and distortion, capable of high reliability and adaptable for use with digital computer processing apparatus.

While the invention has been described in its preferred embodiments, it is to be understood that the words which have been used are words of description rather than of limiitation and that changes may be made within the purview of the appended claims without departing from the true scope and spirit of the invention in its broadest aspects.

I claim:

1. An optical processor fingerprint inspection apparatus comprising:

optical means for generating a diffraction pattern of the fingerprint to be identified in the Fourier transform plane of said inspection apparatus, opaque mask means having at least one internal asymmetric transparent portion disposed fully within said mask means in said Fourier transform plane, said internal asymmetric transparent portion having a radially disposed internal boundary edge cooperating with a curvate internal boundary edge for the cyclic control of the passage of light therethrough, means for cyclically rotating said internal asymmetric transparent portion about the major axis of said optical means through said diffraction pattern, means responsive to radiant energy transmitted cyclically through said transparent portion between said radial and curvate internal boundary edges during passage thereof through said diffraction pattern for sensing the amplitude of ridge line separation of said fingerprint.

2. Apparatus as described in claim 1 wherein said radially disposed internal boundary edge is substantially straight.

3. Apparatus as described in claim 2 wherein the locus of said curvate internal boundary edge is substantially a monotonic function of its radial position versus angle of rotation of said internal asymmetric transparent portion.

4. Apparatus as described in claim 2 wherein said curvate internal boundary edge is substantially a sector of a spiral.

5. Apparatus as described in claim 2 wherein said curvate internal boundary edge is substantially a sector of a circle.

6. Apparatus as described in claim 2 wherein said optical means comprises:

means for illuminating a fingerprint to be inspected with a coherent optical beam to produce a spatially modulated beam representative of said fingerprint, and means for focussing said modulated beam to produce said diffraction pattern at said Fourier transform plane.

7. Apparatus as described in claim 6 further including means oriented for receiving light transmitted through said opaque mask means internal asymmetric transparent portion for forming an image in the plane of said means for sensing radiant energy.

8. Apparatus as described in claim 7 further including a plurality of light detectors positioned in said image plane each at a discrete location and corresponding to a respective finite sample area of the fingerprint to be inspected.

9. Apparatus as described in claim 8 wherein said opaque mask means is disposed in said Fourier transform plane for scanning said diffraction pattern to control the transmission of light to said respective light detectors sequentially in accordance with the orientation and separation of the ridge lines of the related sample areas.

10. Apparatus as described in claim 9 further including means for differentiating the outputs of said respective light detectors for generating sequential signals of first and second polarities.

11. An optical processor fingerprint inspection apparatus comprising:

optical means for generating a diffraction pattern of the fingerprint to be identified in the Fourier transform plane of said inspection apparatus and including:

means for illuminating a fingerprint to be inspected with a coherent optical beam to produce a spatially modulated beam representative of said fingerprint, and means for focussing said modulated beam to produce said diffraction pattern at said Fourier transform plane, opaque mask means having at least one transparent portion and disposed in said Fourier transform plane, said transparent portion having a radially disposed staight boundary edge cooperating with a curvate boundary edge, means for rotating said transparent portion about the major axis of said optical means, means oriented for receiving light transmitted through said opaque mask means transparent portion for forming an image in the plane of means for sensing radiant energy, means responsive to said means for sensing radiant energy transmitted through said transparent portion for sensing the amplitude of ridge line separation of said fingerprint including:

a plurality of light detectors positioned in said image plane at a discrete location and corresponding to a respective finite sample area of the fingerprint to be inspected, said opaque mask means being disposed in said Fourier transform plane for scanning said diffraction pattern to control the transmisson of light to said respective light detectors sequentially in accordance with the orientation and separation of the ridge lines of the related sample areas, means for differentiating the outputs of said respective light detectors for generating sequential signals of first and second polarities, and means for determining a first time interval between a predetermined time reference and the instant of said first polarity signal.

12. Apparatus as described in claim 11 further including means for determining a second time interval between said predetermined time reference and the instant of said second polarity signal.

13. Apparatus as described in claim 12 further including subtractive means for determining a third time interval representative of the difference between said first and second time intervals.

14. Apparatus as described in claim 11 wherein said time interval determining means includes:

a counter, means for resetting said counter at a predetermined scanning position of said internal asymmetric transparent portion, means for generating time pulses for application to said counter for generating timing counts, and means for storing said timing count when corresponding to the interval between the instant of reset and the instant of generation of at least one of said first and second polarity signals.

* * * * *